US012363707B2

(12) United States Patent
Yao et al.

(10) Patent No.: US 12,363,707 B2
(45) Date of Patent: Jul. 15, 2025

(54) ULTRA-RELIABLE LOW LATENCY COMMUNICATION (URLLC) SCHEME SELECTION

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Fangli Xu, Beijing (CN); Haijing Hu, Beijing (CN); Haitong Sun, Cupertino, CA (US); Hong He, Cupertino, CA (US); Jie Cui, San Jose, CA (US); Oghenekome Oteri, San Diego, CA (US); Wei Zeng, San Diego, CA (US); Weidong Yang, San Diego, CA (US); Yang Tang, San Jose, CA (US); Yuchul Kim, San Jose, CA (US); Yuqin Chen, Shenzhen (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 17/912,744

(22) PCT Filed: Apr. 8, 2020

(86) PCT No.: PCT/CN2020/083773
§ 371 (c)(1),
(2) Date: Sep. 19, 2022

(87) PCT Pub. No.: WO2021/203300
PCT Pub. Date: Oct. 14, 2021

(65) Prior Publication Data
US 2023/0133947 A1    May 4, 2023

(51) Int. Cl.
*H04W 72/1273*    (2023.01)
*H04W 72/232*    (2023.01)
*H04W 72/512*    (2023.01)

(52) U.S. Cl.
CPC ..... *H04W 72/1273* (2013.01); *H04W 72/232* (2023.01); *H04W 72/512* (2023.01)

(58) Field of Classification Search
CPC ........... H04W 72/1273; H04W 72/232; H04W 72/512; H04L 5/0094; H04L 5/0044; H04L 5/0053; H04L 5/0023
See application file for complete search history.

(56) References Cited

U.S. PATENT DOCUMENTS

2019/0281587 A1* 9/2019 Zhang ................... H04W 72/23

FOREIGN PATENT DOCUMENTS

CN    109962765    7/2019
CN    110351850    10/2019
(Continued)

OTHER PUBLICATIONS

Office Action for CN Patent Application No. 202080099521.0; Apr. 28, 2023.
(Continued)

*Primary Examiner* — Dady Chery
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to perform URLLC scheme selection. The UE may connect to at least one base station. The UE may determine scheduling of a physical downlink control channel (PDCCH) and a physical downlink shared channel (PDSCH) are within a threshold duration. Based on the PDCCH and the PDSCH being scheduled within the threshold duration, select one or more
(Continued)

transmission control indicator (TCI) states for receiving the PDSCH irrespective of TCI state(s) indicated in the PDCCH. The UE may receive the PDSCH using the selected one or more TCI states.

20 Claims, 11 Drawing Sheets

(56) References Cited

FOREIGN PATENT DOCUMENTS

| | | |
|---|---|---|
| CN | 110366250 | 10/2019 |
| WO | 2019204223 | 10/2019 |
| WO | 2020064878 | 4/2020 |
| WO | 2020017905 | 1/2021 |

OTHER PUBLICATIONS

International Search Report and Written Opinion for PCT Patent Application No. PCT/CN2020/083773; 8 pages; Jan. 4, 2021.
Huawei et al. "Summary of remaining issues on beam failure recovery"; 3GPP TSG RAN WG1 Ad Hoc Meeting R1-1800101; 9 pages; Jan. 26, 2018.
Extended European Search Report for EP Patent Application No. 20930243.9; Apr. 11, 2023.
Oppo "Outcome of email thread [100e-NR-eMIMO-multiTRP-01]"; Feb. 6, 2020.
Xiaomi "Enhancements on Multi-TRP/Panel Transmission"; 3GPP TSG RAN WG1 #99 R1-1912994; Reno, USA; Nov. 18, 2019.

* cited by examiner

| | TCI states | CDM groups | URLLCRepNum | URLLCScheme Enabler | UE Behavior |
|---|---|---|---|---|---|
| 0 (in spec draft) | 1 | >=1 | Not applicable | Not applicable | Rel 15 |
| A (one scheme) | 1 | 1 | Condition 1 | Configured or not configured | "Scheme 4" with repetition from the same TRP Limitations agreed for Scheme 4 apply |
| A' (in spec draft) | 1 | >=1 | Condition 2 | Not configured | Rel 15 |
| B (in spec draft) | 2 | 1 | Condition 1 | Not configured | Scheme 4 |
| C (in spec draft) | 2 | 2 | Condition 2 | Not configured | Scheme 1a/NCJT |
| E (in spec draft) | 2 | 2 | Condition 3 | Not configured | Scheme 1a/NCJT |
| F (in spec draft) | 2 | 1 | Condition 3 | Configured | Scheme 2a/2b/3 |
| D" (one scheme) | 2 | 2 | Condition 2 | Configured | Scheme 1a/NCJT |
| G' (one scheme) | 1 | >=1 | Condition 3 | Configured | Rel 15 |
| G (one scheme) | 1 | >=1 | Condition 3 | Configured | Rel 15 |

FIG. 9

ULTRA-RELIABLE LOW LATENCY COMMUNICATION (URLLC) SCHEME SELECTION

PRIORITY CLAIM

This application is a national phase entry of PCT application number PCT/CN2020/083773, entitled "Ultra-Reliable Low Latency Communication (URLLC) Scheme Selection," filed Apr. 8, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for acquiring on demand system information.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, for example in 5G new radio (NR), some system information is periodically broadcast by a cellular network while other system information is available on request. However, it may be up to an individual UE to determine when to request the on-demand system information. Further, communication failures (e.g., of a random access channel) may interfere with such a request for on-demand system information and it may be up to an individual UE to determine how to overcome such a problem. Thus, improvements in the field are desirable.

SUMMARY

Embodiments are presented herein of apparatuses, systems, and methods for reducing performing ultra-reliable low latency communication (URLLC) scheme selection in a wireless communication system.

The UE may connect to at least one base station. The UE may determine scheduling of a physical downlink control channel (PDCCH) and a physical downlink shared channel (PDSCH) are within a threshold duration. Based on the PDCCH and the PDSCH being scheduled within the threshold duration, select one or more transmission control indicator (TCI) states for receiving the PDSCH irrespective of TCI state(s) indicated in the PDCCH. The UE may receive the PDSCH using the selected one or more TCI states.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which:

FIG. 9 illustrates an exemplary table for URLLC scheme selection, according to some embodiments;

Figure 1:
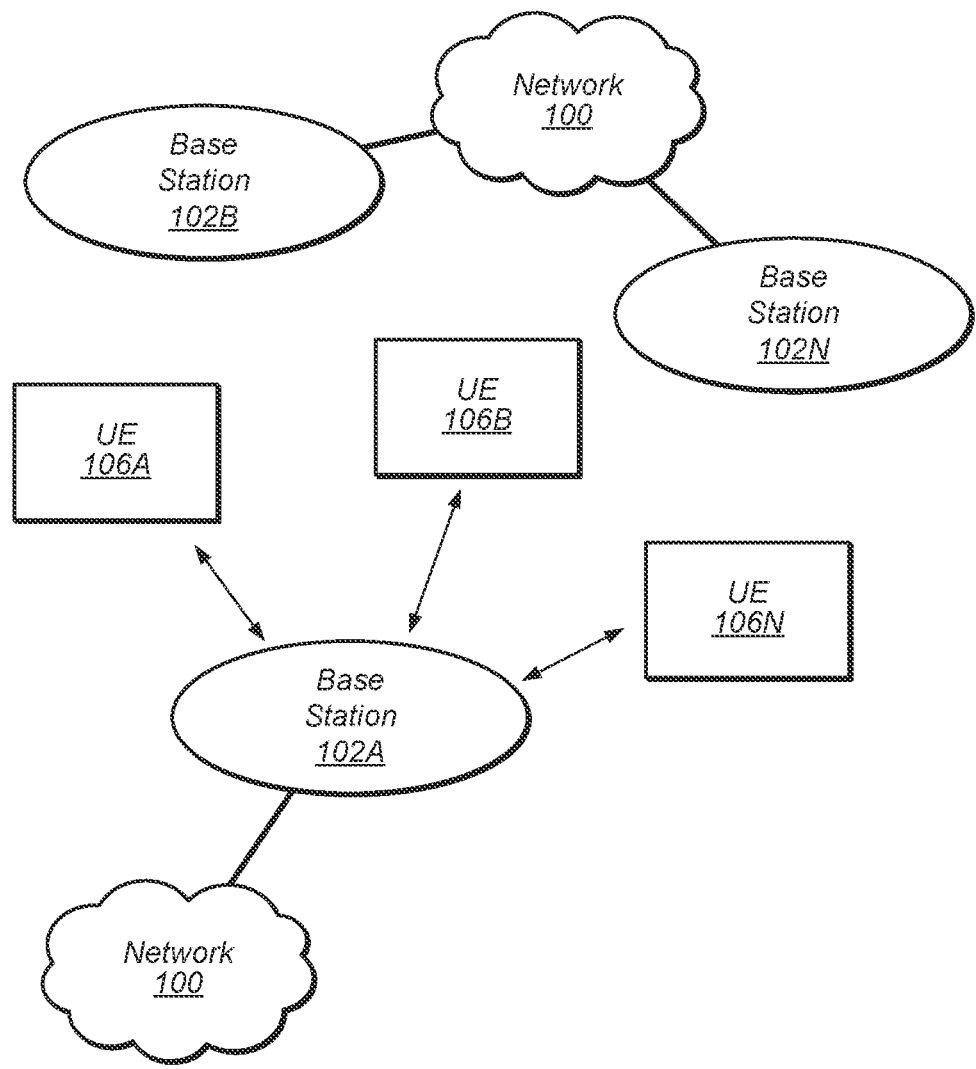
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
UE: User Equipment
BS: Base Station
ENB: eNodeB (Base Station)
LTE: Long Term Evolution
UMTS: Universal Mobile Telecommunications System RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device") —any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
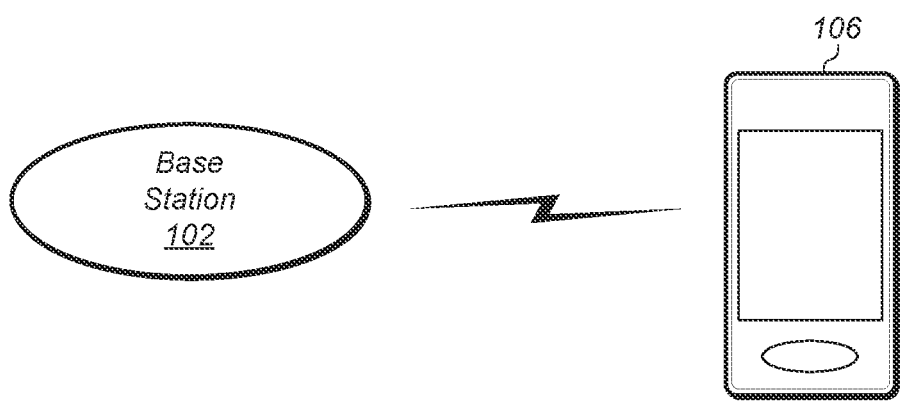
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
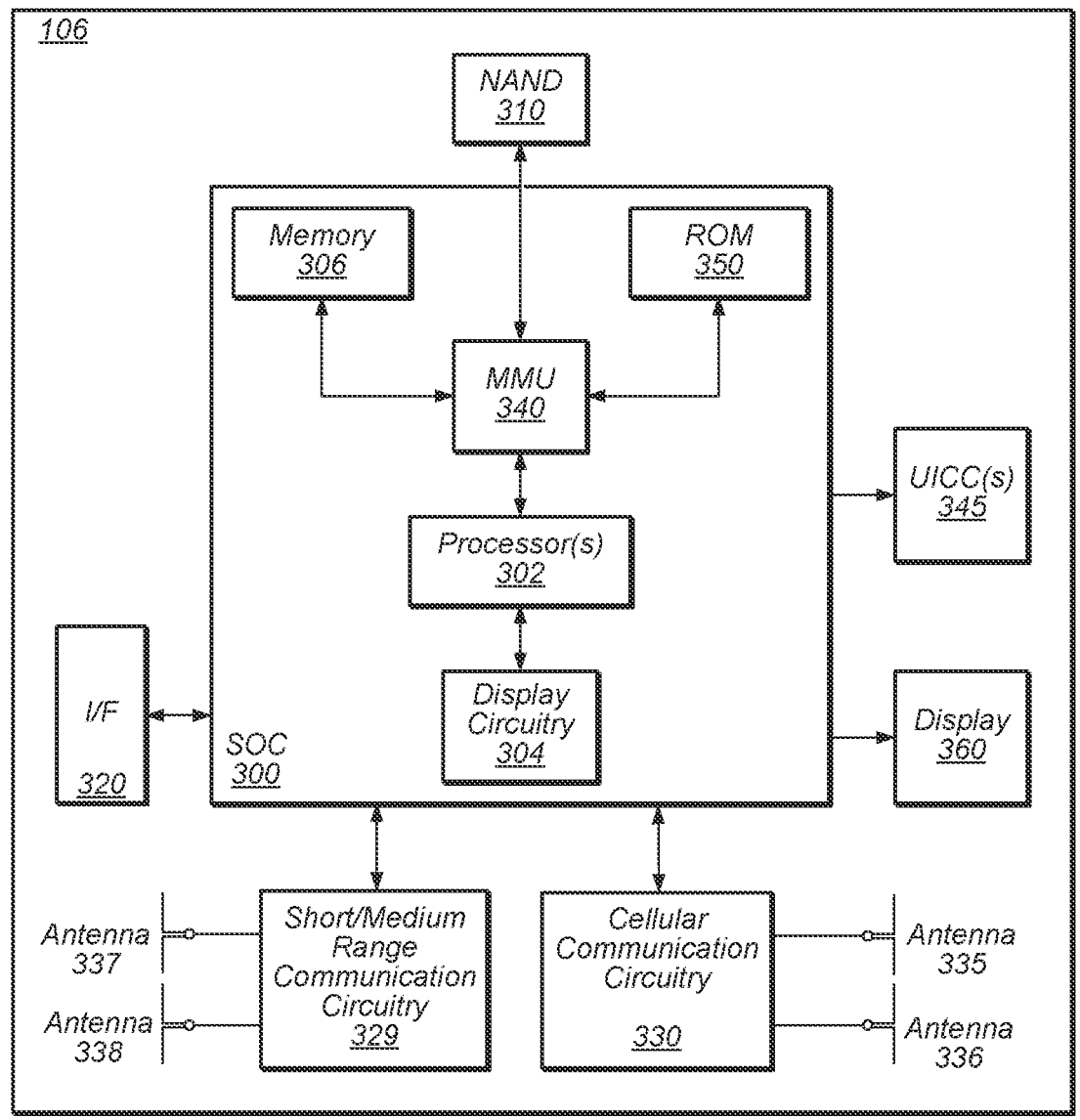
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
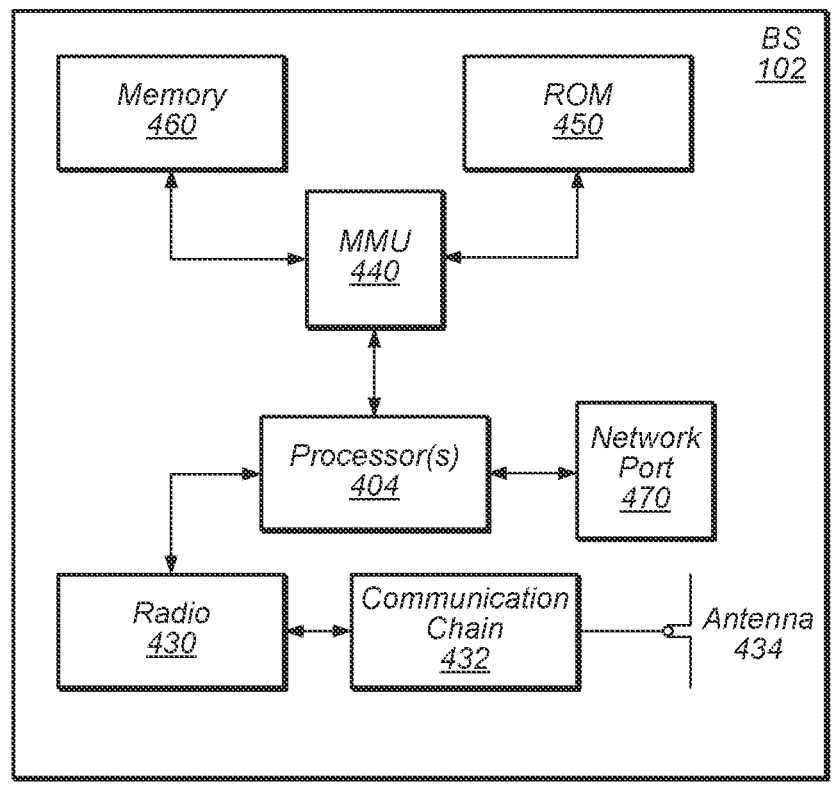
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
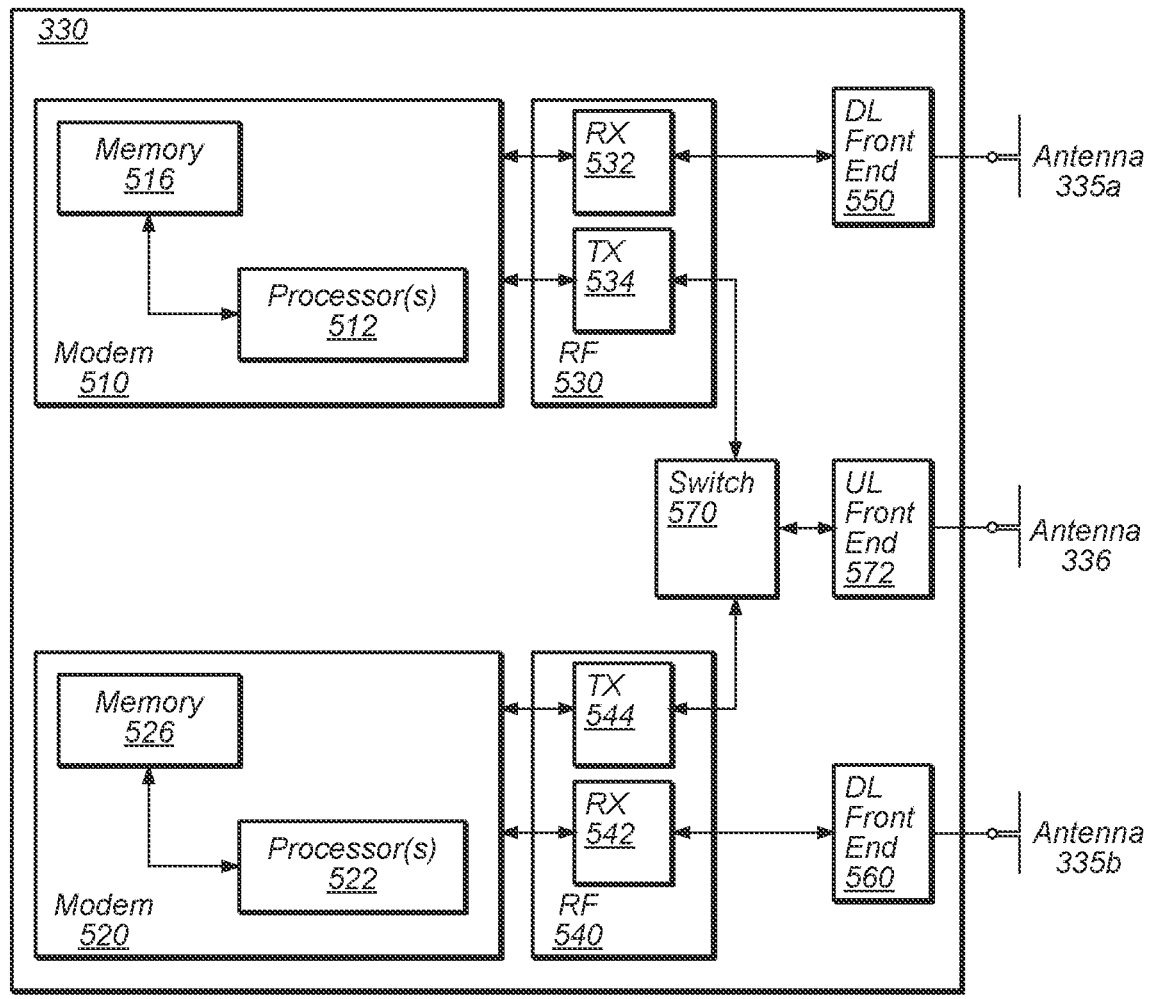
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
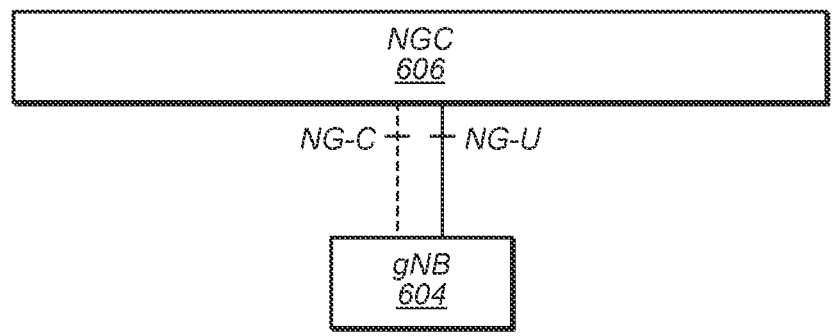
FIGS. 6 and 7 illustrate examples of a 5G NR base station (gNB), according to some embodiments.
Figure 7:
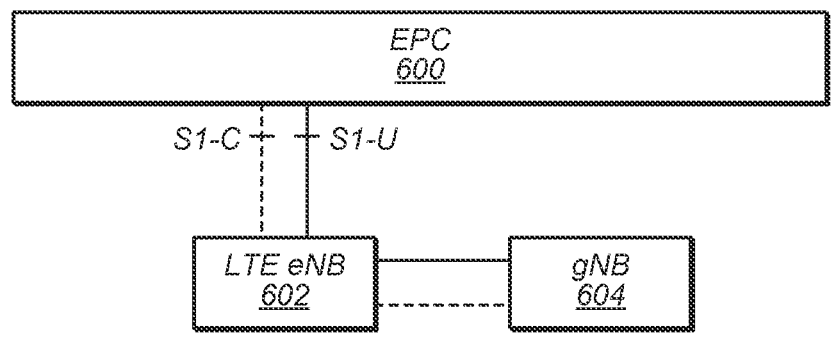

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
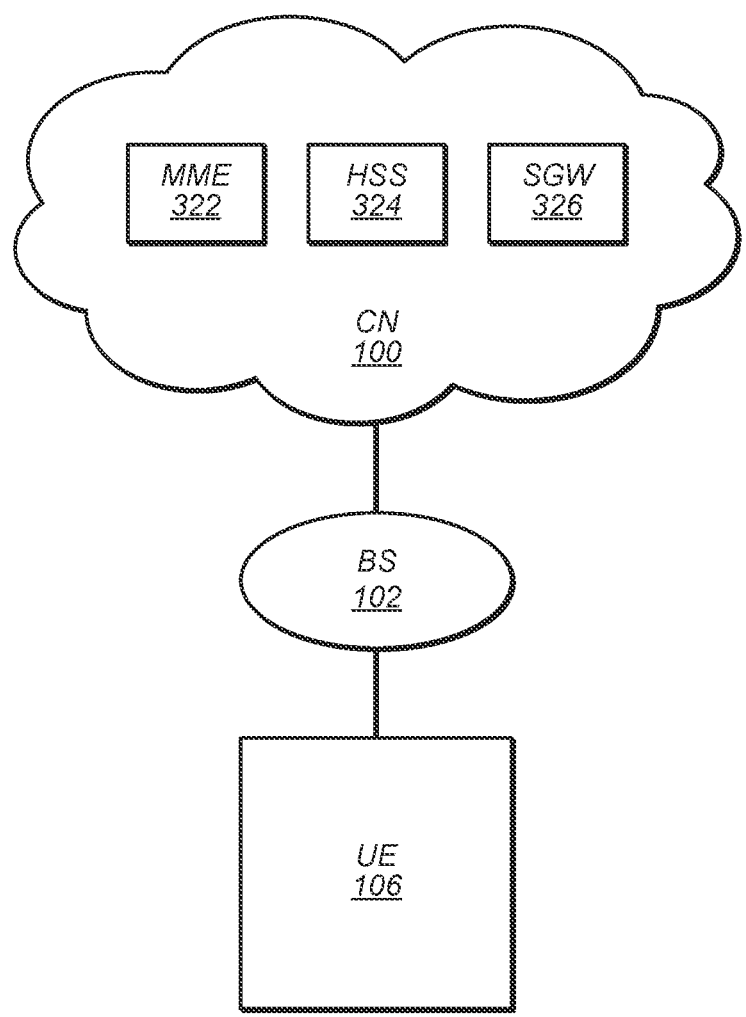
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

URLLC Scheme Selection

In some embodiments, the following ultra-reliable low latency communication (URLLC) schemes are supported, where PDSCH can be carried by multiple transmission configuration indicator (TCI) states (or beams):

Scheme 1a: PDSCH from different TCI states are multiplexed in a spatial domain multiplexing (SDM) manner;

Scheme 2a/2b: PDSCH from different TCI states are multiplexed in a frequency domain multiplexing (FDM) manner;

Scheme 3: PDSCH from different TCI states are multiplexed in a time domain multiplexing (TDM) manner within a slot; and Scheme 4: PDSCH from different TCI states are multiplexed in TDM manner across slots.

In some embodiments, all the URLLC schemes are scheduled by a single PDCCH. A scheme may be indicated in RRC signaling from the base station. Additionally, or alternatively, the scheme may be changed dynamically using further signaling, e.g., within DCI.

A UE may normally detect which beam or beams (e.g., TCI(s)) to use to receive the PDSCH. However, if the UE is scheduled to receive the PDSCH within a threshold amount of time or number of symbols (e.g., 28 symbols, among other possibilities), the UE may not be able to decode the PDCCH in time to determine the TCI to use for receiving and decoding the PDSCH. Accordingly, there are a variety of different embodiments that may apply, depending on various factors.

For example, if a UE supports multi-TCI based default PDSCH quasi colocation (QCL), the UE may use the two TCI states corresponding to the lowest TCI codepoint in DCI to receive the PDSCH.

Otherwise, the UE may use a single TCI state to receive the PDSCH. The single TCI state may indicate the TCI state applied to a CORESET in latest slot with lowest ID when multiple CORESETs are configured. If there is no CORESET configured, the single TCI state may indicate the TCI state with lowest ID activated by MAC CE.

In some embodiments, the dynamic switching of URLLC scheme selection may be described by the table shown in FIG. 9, where:

Condition 1: the indicated entry in PDSCH-TimeDomain-AllocationList contains URLLCRepNum (>1) in the Time Domain Resource Allocation (TDRA) in DCI;

Condition 2: the indicated entry in PDSCH-TimeDomain-AllocationList does not contain URLLCRepNum (>1) in the Time Domain Resource Allocation (TDRA) in DCI, but at least one entry does; and Condition 3: no entry in PDSCH-TimeDomainAllocationList contains URLLCRepNum (>1) in the Time Domain Resource Allocation (TDRA) in DCI.

In some embodiments, when the scheduling offset is below the threshold (e.g., the UE cannot decode the PDCCH in time to determine the indicated TCI for PDSCH decoding), if supported, the UE may apply two TCI states to receive PDSCH. However, there may be some issues. For example, it is unclear what the UE assumption for the URLLC scheme for the PDSCH reception would be if the number of indicated TCI states in the DCI field is 1.

Additionally, it is unclear how to map TCI states and DMRS ports if the number of indicated Code Division Multiplexing (CDM) groups for DMRS is not 2 (e.g., when the number of indicated CDM groups are 1 or 3, among other possibilities).

Further, when the scheduling offset is below a threshold, if the UE does not support multi-TCI as default PDSCH QCL, the UE may apply 1 TCI state to receive PDSCH. However, in this case, it is unclear what the UE assumption for the URLLC scheme for the PDSCH reception would be if the number of indicated TCI states in the DCI field is 2.

Accordingly, in one embodiment, the UE assumption of the URLLC scheme for the table shown in FIG. 9 may be based on the number of indicated TCI states. Then one of the two TCI states to receive PDSCH can be used to decode PDSCH. As a first option, the UE may select the first TCI state; alternatively, the UE may select the second TCI state. As another possibility, which TCI state to be applied may be configured by the base station by higher layer signaling, e.g., RRC signaling or Downlink Control Information (DCI). For example, the selection may be indicated explicitly or derived from other information (e.g., a DCI indication such as a DMRS port index indication). As another possibility, the TCI state may be selected based on the slot index, e.g., the first TCI state may be selected for even slots and the second TCI state may be selected for odd slots, among other possibilities.

Figure 10:
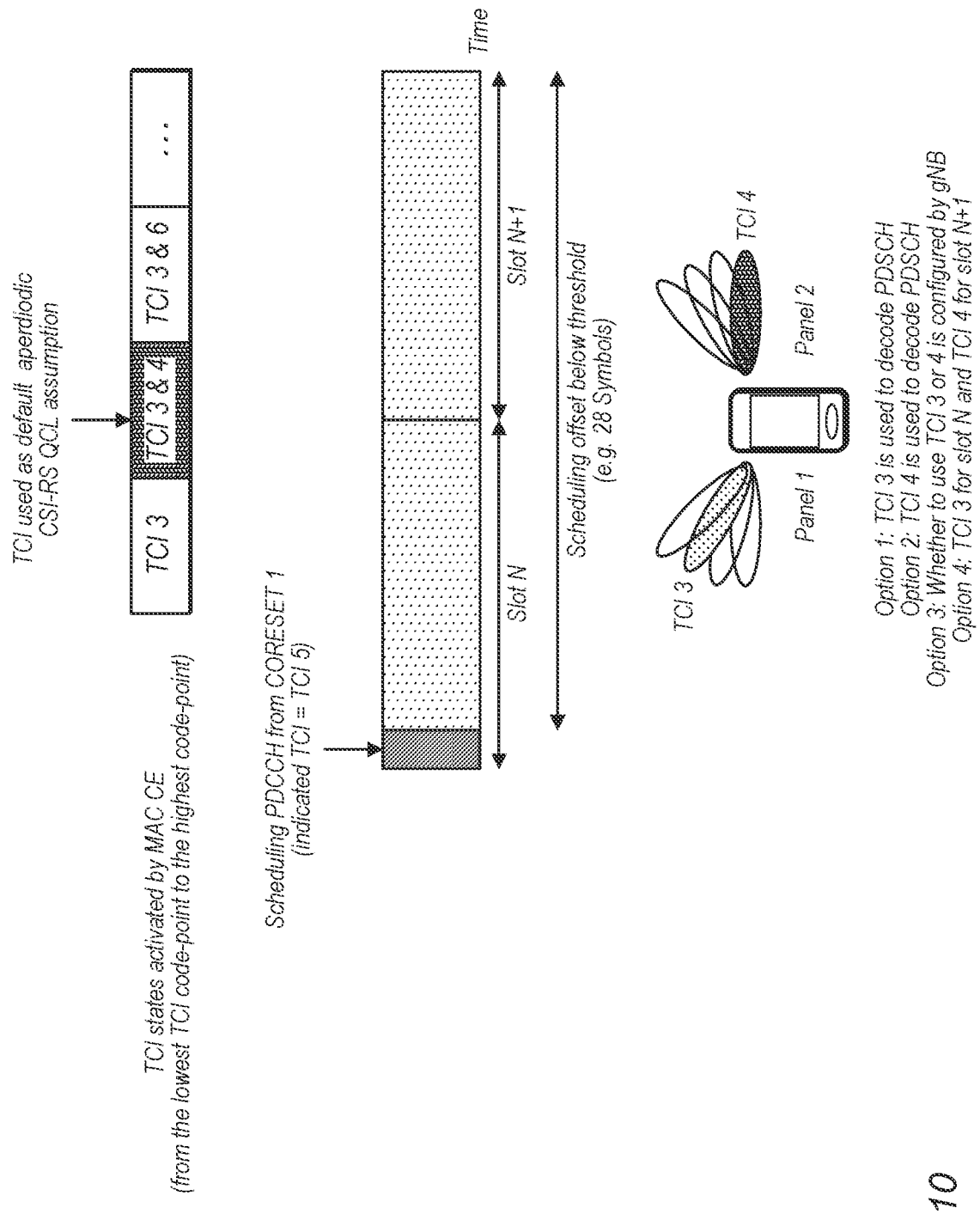
FIGS. 10-12 illustrate examples of TCI selection for a UE, according to some embodiments.

FIG. 10 provides an example of these various embodiments. As shown, the UE may support using two TCI states. The TCI states may be activated by MAC CE (e.g., from the lowest TCI code-point to the highest code-point). Accordingly, the UE may be configured to select the lowest TCI code point that includes two TCI states. As shown, the lowest TCI code point with two TCI states is TCI 3 and 4. Thus, this TCI code point may be used as the default aperiodic CSI-RS QCL assumption. Additionally, as shown, the UE is configured to receive the PDSCH within the threshold, i.e., the scheduling offset is less than the threshold of 28 symbols (which is exemplary only, and other numbers of symbols or time durations are envisioned). Accordingly, the UE may ignore the PDCCH TCI indication of TCI 5 and select between TCI 3 and 4 for slots N and N+1 according to the embodiments described herein. In particular, the UE may select TCI 3 (option 1), the UE may select TCI 4 (option 2), the UE may select TCI 3 or 4 based on signaling from the base station (option 3), or the UE may select one TCI for slot N and a different TCI for slot N+1 (e.g., TCI 3 and 4 respectively, although the order could be reversed).

In some embodiments, the UE assumption for the URLLC scheme (e.g., referring to the table in FIG. 9) may be based on the number of TCI states and/or the number of indicated TCI states to be used to receive PDSCH. In one example, e.g., in this case, the number of TCI states to determine URLLC may always be 2.

Similar to above, when the PDSCH transmission occurs within the threshold, one or more of the following embodiments may be applied. In one option, it may be considered as an error case. In particular, the whole PDSCH transmission occasion should be either within the scheduling offset, or above scheduling offset, or the number of indicated TCI state equals to the number of TCI states to buffer PDSCH. Thus, rather than solving this case, it may be best for the standard to stipulate that it should not be performed, e.g., that the base station does not schedule the PDSCH transmission both inside and outside of the threshold duration.

In another option, the UE assumption of URLLC scheme for the table in FIG. 9 may be based on the min of {N, M}, where N indicates the number of indicated TCI states and M indicates the number of TCI states to receive PDSCH prior to the threshold. As another option, the UE assumption of URLLC scheme for the table in FIG. 9 is based on the max of {N, M}. As another option, the UE assumption of URLLC scheme for the table in FIG. 9 is based on the min of {N+M, 2}. In each of these cases, the resulting TCI states may be 1 or 2. In one embodiment, if the total number of different TCI states to receive PDSCH is above 1, the UE may select one TCI state to receive each repetition of PDSCH, e.g., for each PDSCH slot. The various embodiments discussed herein for selecting the TCI slot may be applied.

Figure 11:
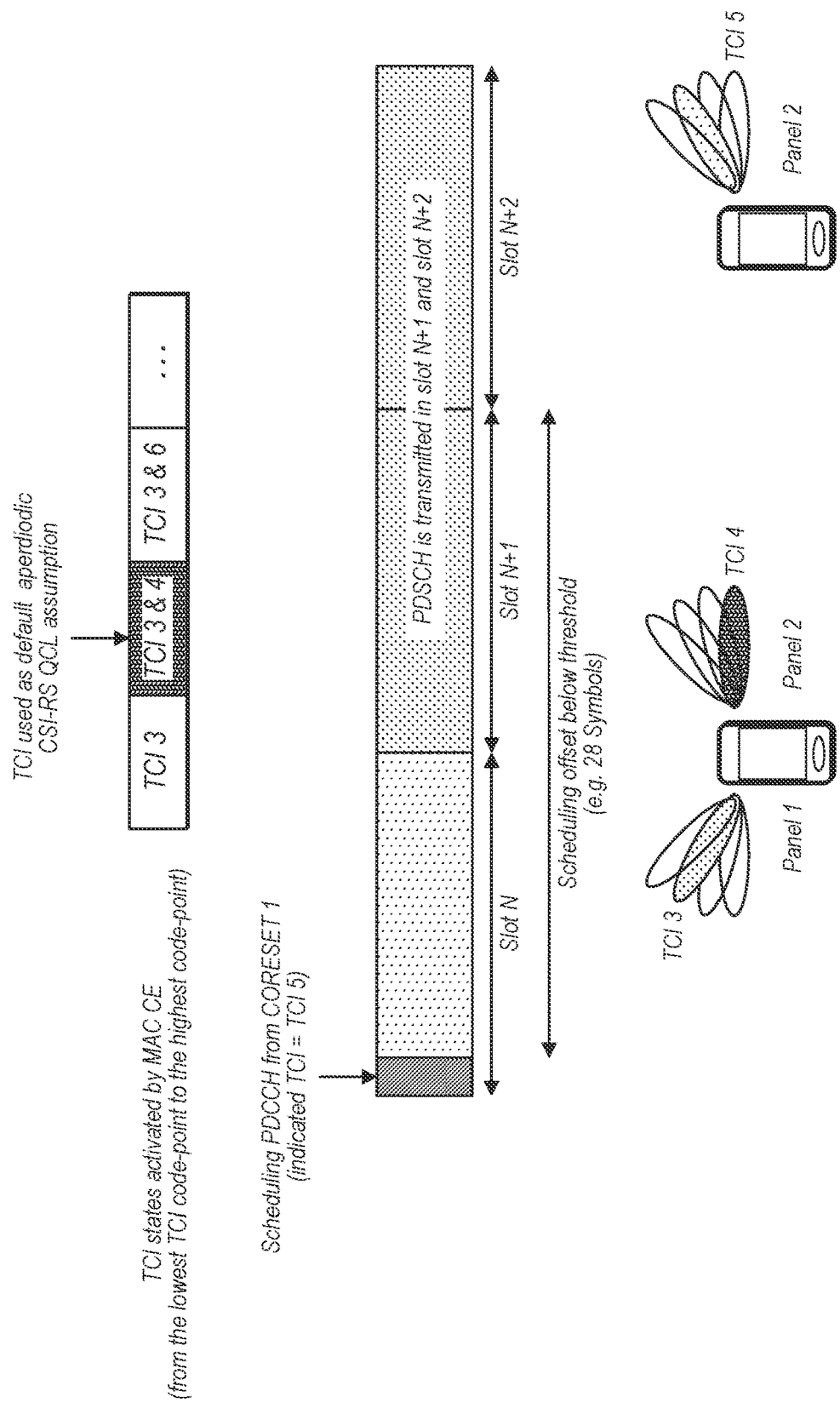

FIG. 11 provides an example for various embodiments described herein. Similar to FIG. 10, in the example shown, the default TCI code point that has two TCI states is 3 and 4. In this example, the PDCCH indicates that TCI 5 should be used; however, the PDSCH is transmitted both within the threshold (slot N+1) and outside the threshold (slot N+2). According to the embodiments discussed above, when the UE assumption is based on the min of {N, M}, the number of TCI states to determine URLLC scheme may be 1. Alternatively, when the UE assumption is based on the max of {N, M}, the number of TCI states to determine URLLC scheme may be 2. Alternatively, when the UE assumption is based on the min of {N+M, 2}, the number of TCI states to determine URLLC scheme may be 2. In slot N+1, TCI 3 or 4 may be used to receive PDSCH, e.g., which may be selected based on embodiments described above regarding FIG. 10, among others). However, in at least some embodiments, in slot N+2, TCI 5 can be used to receive PDSCH as there is time for the UE to decode the PDCCH to determine and use the specified TCI state from the PDCCH.

If the number of TCI states to buffer PDSCH prior to threshold is 2 and the number of indicated CDM group for DMRS is 1, then one or more of the following embodiments may apply.

In some embodiments, e.g., for a single-TRP scheme (Rel-15) or scheme 4, the DMRS port(s) may be mapped to one TCI state. Various embodiments discussed herein (e.g., above) may be used to perform TCI selection. In one example, the index of TCI state may be equal to the indicated CDM group index mod 2.

In another embodiment, this case may be considered an error. For example, it may not be allowed for the base station to indicated CDM group for DMRS to not match the number of TCI states.

In one embodiment, for scheme 2a/2b, the DMRS port(s) may be mapped to the first TCI state for the first half of RBs and mapped to the second TCI state for the second half of RBs.

In one embodiment, for scheme 3, the DMRS port(s) may be mapped to the first TCI state for the first PDSCH repetition and mapped to the second TCI state for the second repetition.

In one embodiment, for scheme 4, DMRS port(s) for some PDSCH slot(s) may be mapped to the first TCI state and DMRS port(s) for the rest PDSCH slot(s) may be mapped to the second TCI state. The mapping pattern could be configured by higher layer signaling, or in other manners.

As another option (e.g., combining various embodiments discussed herein), if URLLCSchemeEnabler is configured and if URLLCRepNum>1 is indicated by TDRA in DCI, then scheme 4 may be applied, otherwise scheme 3 may be applied. Alternatively, no matter whether URLLCRepNum>1 is indicated by DCI or not, scheme 3 may be applied.

If URLLCSchemeEnabler is not configured and if URLLCRepNum>1 is indicated by TDRA in DCI, scheme 4 may be applied. Otherwise if URLLCSchemeEnabler is not configured, scheme 2a/2b may be applied.

If the number of TCI states to buffer PDSCH prior to threshold is 2 and the number of indicated CDM group for DMRS is 3, then one or more of the following embodiments may apply.

In one embodiment, the single-TRP scheme (Rel-15) may be used. In this case, the DMRS port(s) should be mapped to one TCI state. Various embodiments discussed herein may be used for TCI state selection. Additionally, or alternatively, the index of the TCI state may be equal to the indicated CDM group index mod 2.

In another embodiment, this case may be considered an error. For example, it may not be allowed for the base station to indicated CDM group for DMRS to not match the number of TCI states.

In one embodiment, for scheme 1a, the DMRS port(s) and TCI mapping could be determined by the CDM group index. Alternatively, or additionally, the DMRS port(s) and TCI mapping could be configured by higher layer signaling (e.g., message(s) from the base station, explicit or implicit).

In some embodiments, the number of TCI state to determine the URLLC scheme is based on the number of indicated TCI states (N, e.g., N=2) and/or the number of TCI states to receive PDSCH prior to threshold (M, e.g., M=1). In one embodiment, the URLLC scheme may be determined based on N only. Alternatively, the URLLC scheme may be determined based on M only. Other possibilities or combinations are envisioned.

When the PDSCH transmission is within the threshold, the number of TCI states to determine the URLLC scheme may be equal to the number of different TCI states to receive the whole PDSCH transmission occasion, which should be no more than 2.

However, if the number of different TCI states is more than 2, in one embodiment, the UE may apply the beam pattern based on the first two different TCI states in turn and/or the UE may apply the second TCI state to receive all the remaining repetitions. Alternatively, similar to above, the portion of the PDSCH received after the threshold may be set based on the TCI state indicated by the PDCCH.

In one embodiment, the number of TCI states to determine the URLLC scheme may be set to the min{N, M} or max {N, M}, as desired.

In a further embodiment, this case may be considered an error and may not be allowed by the standard and/or base station.

Figure 12:
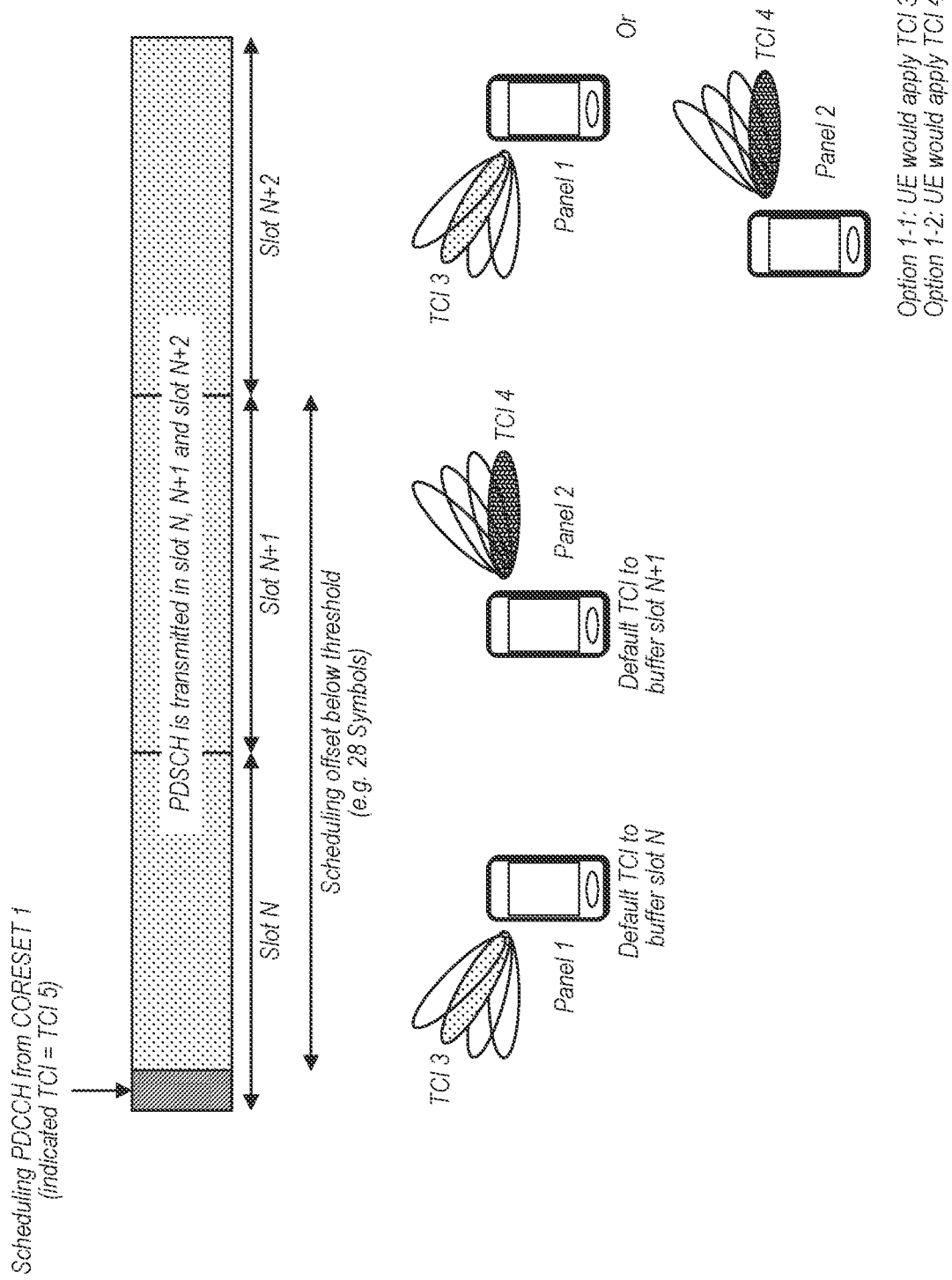

FIG. 12 provides an example corresponding to these embodiments. As shown, the PDSCH is transmitted across slots N, N+1, and N+2. In this example, for slot N, the UE may use the first TCI state of the default TCI states 3 and 4, and for slot N+1, the UE may use the second TCI state of the default TCI states 3 and 4. As shown, the UE may use TCI 3 for slot N and TCI 4 for slot N+1. For N+2, the UE may use either TCI 3 or TCI 4. However, as discussed above, the UE may be configured to use TCI 5 based on the PDCCH indication, as slot N+2 is outside of the threshold.

Note that while various embodiments described herein relate to URLLC, they may also apply to non-URLLC communications, e.g., for performing TCI state selection.

Figure 13:
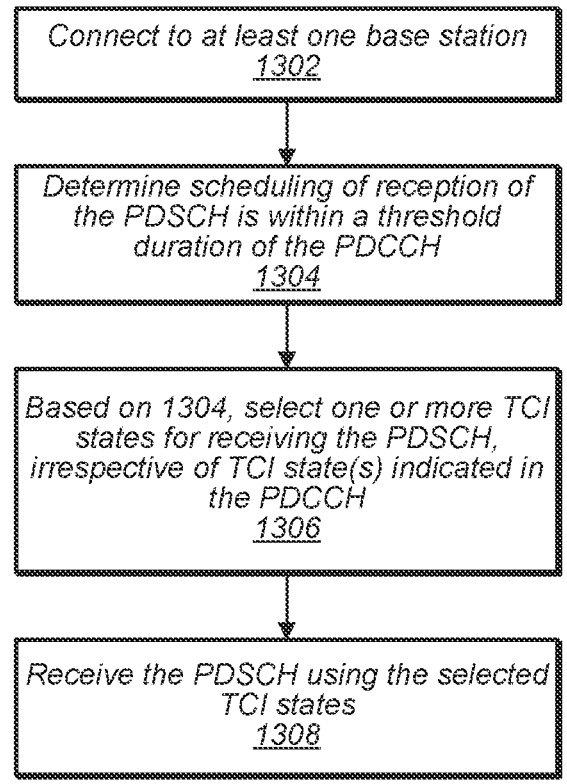
FIG. 13 is a flow chart diagram illustrating an example method for determining TCI states for PDSCH reception, according to some embodiments.

FIG. 13—Determining TCI States for PDSCH Reception

FIG. 13 illustrates exemplary techniques for determining TCI states for PDSCH reception. Aspects of the method of FIG. 13 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish communication with a network 100 (1102), according to some embodiments. The communication may occur via any number of TRPs, e.g., any number of BS 102. It will be appreciated that multiple TRPs may be controlled or coordinated by a single network element of network 100 (e.g., an element of a core network 606 or 600, or of a radio access network (RAN)). For example, one TRP may be a macro cell while another TRP may be a small cell. One or more TRP may operate according to any of various wireless standards and/or use any combination of frequency resources. For example, one TRP may be associated with licensed access and another TRP may be associated with unlicensed access. The UE may be configured to receive PDCCH or PDSCH from one or a plurality of base stations or TRPs in the following steps.

The UE may determine that scheduling of reception of the PDSCH for the UE is within a threshold duration (e.g., period of time, symbol duration, etc.) of the PDDCH (1304).

Based on the PDCCH and the PDSCH being scheduled within the threshold duration, the UE may select one or more transmission control indicator (TCI) states for receiving the PDSCH (1306). These selected TCI states may be selected irrespective of TCI state(s) indicated in the PDCCH. For example, the PDCCH and the selected TCI states may be the same or different, but the selection mechanism for the TCI states may not be based on the TCI state(s) indicated in the PDCCH, e.g., at least for the portion of the PDSCH received within the threshold duration. In some embodiments, the UE may not decode the PDCCH or may not determine or use the indicated TCI state(s) in the PDCCH until after the threshold duration.

The selection of the one or more TCI states may be based on the various embodiments described herein. For example, UE may be configured to receive information indicating one or more TCI states within the DCI. Accordingly, selecting the one or more TCI states may be based on the number of indicated TCI states in the DCI.

For example, if the UE supports and/or is configured to use two TCI states, but the number of indicated TCI states is 1, the UE may be configured to select a first TCI state of the two TCI states for receiving the PDSCH. The selection of the TCI state may be based on: a predetermine rule, explicit signaling received from the base station, implicit signaling received from the base station, and/or the slot that the PDSCH is received in, among other possibilities.

When the PDSCH is spread across the threshold duration (i.e., a first portion of the PDSCH is scheduled for reception before the threshold duration and a second portion of the PDSCH is scheduled for reception after the threshold duration), the selection may be applied for the first portion and a different TCI state selection (e.g., based on the indication of TCI states in the DCI) may be used for the second portion.

In some embodiments, when the PDSCH is repeated in time, a first TCI state may be used for receiving the first repetition and a second TCI state may be used for receiving a second repetition.

The UE may receive the PDSCH using the selected one or more TCI states (1308). As part of the selection process, the UE may determine an ultra-reliable low latency communication (URLLC) scheme. Accordingly, receiving the PDSCH may be performed based on the determined URLLC scheme.

EXEMPLARY EMBODIMENTS

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

The following paragraphs provide example embodiments.

In some embodiments, an apparatus includes one or more processors, wherein the one or more processors are configured to cause a user equipment (UE) to: connect to at least one base station; determine scheduling of physical downlink control channel (PDCCH) and physical downlink shared channel (PDSCH) are within a threshold duration; based on the PDCCH and the PDSCH being scheduled within the threshold duration, select one or more transmission control indicator (TCI) states for receiving the PDSCH irrespective of TCI state(s) indicated in the PDCCH; and receive the PDSCH using the selected one or more TCI states.

In some embodiments, selecting the one or more TCI states is performed without decoding the PDCCH.

In some embodiments, the one or more processors are further configured to: determine an ultra-reliable low latency communication (URLLC) scheme; wherein said receiving the PDSCH is performed based on the determined URLLC scheme.

In some embodiments, the one or more processors are further configured to: receive information indicating one or more TCI states within downlink control information (DCI); wherein said selecting the one or more TCI states is performed based on the number of indicated TCI states.

In some embodiments, the UE is configured to use two TCI states, wherein the number of indicated TCI states is 1, and wherein the one or more processors are further configured to: select a first TCI state of the two TCI states.

In some embodiments, selecting the first TCI state is based on one or more of: a predetermine rule; explicit signaling received from the base station; implicit signaling received from the base station; or the slot that the PDSCH is received in.

In some embodiments, the PDSCH is spread across the threshold duration, wherein said selecting the one or more TCI states is performed for a portion of the PDSCH received before the threshold, and wherein the one or more processors are further configured to: decode the PDCCH to determine an indicated TCI state; wherein said receiving the PDSCH is performed using the indicated TCI state for a portion of the PDSCH received after the threshold.

In some embodiments, the PDSCH is repeated in time, wherein a first TCI state is used for receiving a first repetition, and wherein a second TCI state is used for receiving a second repetition.

In some embodiments, a user equipment device (UE) includes: wireless communication circuitry; and one or more processors coupled to the wireless communication circuitry, wherein the one or more processors are configured to cause a user equipment (UE) to: connect to at least one base station; determine scheduling of physical downlink control channel (PDCCH) and physical downlink shared channel (PDSCH) are within a threshold period of time; based on the PDCCH and the PDSCH being scheduled within the threshold period of time, select one or more transmission control indicator (TCI) states for receiving the PDSCH; and receive the PDSCH using the selected one or more TCI states.

In some embodiments, selecting the one or more TCI states is performed without decoding the PDCCH.

In some embodiments, the one or more processors are further configured to: determine an ultra-reliable low latency communication (URLLC) scheme; wherein said receiving the PDSCH is performed based on the determined URLLC scheme.

In some embodiments, the one or more processors are further configured to: receive information indicating one or more TCI states within downlink control information (DCI); wherein said selecting the one or more TCI states is performed based on the number of indicated TCI states.

In some embodiments, the UE is configured to use two TCI states, wherein the number of indicated TCI states is 1, and wherein the one or more processors are further configured to: select a first TCI state of the two TCI states.

In some embodiments, selecting the first TCI state is based on one or more of: a predetermine rule; explicit signaling received from the base station; implicit signaling received from the base station; or the slot that the PDSCH is received in.

In some embodiments, the PDSCH is spread across the threshold period of time, wherein said selecting the one or more TCI states is performed for a portion of the PDSCH received before the threshold, and wherein the one or more processors are further configured to: decode the PDCCH to determine an indicated TCI state; wherein said receiving the PDSCH is performed using the indicated TCI state for a portion of the PDSCH received after the threshold.

In some embodiments, the PDSCH is repeated in time, wherein a first TCI state is used for receiving a first repetition, and wherein a second TCI state is used for receiving a second repetition.

In some embodiments, a method for operating a user equipment (UE) includes:
by the UE: connecting to at least one base station; determining scheduled reception of physical downlink shared channel (PDSCH) is within a threshold period of time after scheduled reception physical downlink control channel (PDCCH); based on the scheduled reception of the PDSCH being within the threshold period of time after the scheduled reception of the PDCCH, selecting one or more transmission control indicator (TCI) states for receiving the PDSCH irrespective of TCI state(s) indicated in the PDCCH, wherein the one or more TCI states are different than the TCI state(s) indicated in the PDCCH; and receiving the PDSCH using the selected one or more TCI states.

In some embodiments, the method further includes determining an ultra-reliable low latency communication (URLLC) scheme; wherein said receiving the PDSCH is performed based on the determined URLLC scheme.

In some embodiments, the method further includes receiving information indicating one or more TCI states within downlink control information (DCI); wherein said selecting the one or more TCI states is performed based on the number of indicated TCI states.

In some embodiments, the PDSCH is repeated in time, wherein a first TCI state is used for receiving a first repetition, and wherein a second TCI state is used for receiving a second repetition.

In some embodiments, a device includes: an antenna; a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to, when executing instructions stored in a memory, perform operations comprising:
connecting to at least one base station;
determining scheduling of a physical downlink control channel (PDCCH) and a physical downlink shared channel (PDSCH) are within a threshold duration;
selecting, based on the PDCCH and the PDSCH being scheduled within the threshold duration, one or more transmission control indicator (TCI) states for receiving the PDSCH irrespective of TCI state(s) indicated in the PDCCH, wherein the selected one or more TCI states correspond to a lowest TCI codepoint that includes two TCI states; and
receiving the PDSCH using the selected one or more TCI states, wherein the PDSCH is repeated in time, wherein a first TCI state of the selected one or more TCI states is used for receiving a first repetition, and wherein a second TCI state of the selected one or more TCI states is used for receiving a second repetition.

2. The apparatus of claim 1, wherein said selecting the one or more TCI states is also based on support of multiple transmission control indicator (multi-TCI) based default PDSCH quasi-colocation (QCL), wherein the first repetition of the PDSCH is within the threshold duration, and wherein the second repetition of the PDSCH is within the threshold duration.

3. The apparatus of claim 1, wherein the operations further comprise:
determining an ultra-reliable low latency communication (URLLC) scheme;
wherein said receiving the PDSCH is performed based on the determined URLLC scheme.

4. The apparatus of claim 1, wherein the operations further comprise:
receiving information indicating one or more TCI states within downlink control information (DCI);
wherein said selecting the one or more TCI states is performed based on the number of indicated TCI states.

5. The apparatus of claim 1, wherein the PDSCH is spread across the threshold duration, wherein said selecting the one or more TCI states is performed for a portion of the PDSCH received before the threshold, and wherein the operations further comprise:
decoding the PDCCH to determine an indicated TCI state;
wherein said receiving the PDSCH is performed using the indicated TCI state for a portion of the PDSCH received after the threshold.

6. A user equipment device (UE), comprising:
wireless communication circuitry; and
one or more processors coupled to the wireless communication circuitry, wherein the one or more processors are configured to cause the UE to:
connect to at least one base station;
determine scheduling of a physical downlink control channel (PDCCH) and a physical downlink shared channel (PDSCH) are within a threshold period of time;
select, based on the PDCCH and the PDSCH being scheduled within the threshold period of time, one or more transmission control indicator (TCI) states for receiving the PDSCH, wherein the selected one or more TCI states correspond to a lowest TCI codepoint that includes two TCI states; and
receive the PDSCH using the selected one or more TCI states, wherein the PDSCH is repeated in time, wherein a first TCI state of the selected one or more TCI states is used for receiving a first repetition, and wherein a second TCI state of the selected one or more TCI states is used for receiving a second repetition.

7. The UE of claim 6, wherein said selecting the one or more TCI states is also based on support of multiple transmission control indicator (multi-TCI) based default PDSCH quasi-colocation (QCL), wherein the first repetition of the PDSCH is within the threshold duration, and wherein the second repetition of the PDSCH is within the threshold duration.

8. The UE of claim 6, wherein the one or more processors are further configured to:
 determine an ultra-reliable low latency communication (URLLC) scheme;
 wherein said receiving the PDSCH is performed based on the determined URLLC scheme.

9. The UE of claim 6, wherein the one or more processors are further configured to:
 receive information indicating one or more TCI states within downlink control information (DCI);
 wherein said selecting the one or more TCI states is performed based on the number of indicated TCI states.

10. The UE of claim 6, wherein the PDSCH is spread across the threshold period of time, wherein said selecting the one or more TCI states is performed for a portion of the PDSCH received before the threshold, and wherein the one or more processors are further configured to:
 decode the PDCCH to determine an indicated TCI state;
 wherein said receiving the PDSCH is performed using the indicated TCI state for a portion of the PDSCH received after the threshold.

11. A method for operating a user equipment (UE), comprising:
 by the UE:
  connecting to at least one base station;
  determining scheduled reception of a physical downlink shared channel (PDSCH) is within a threshold period of time after scheduled reception a physical downlink control channel (PDCCH);
  selecting, based on the scheduled reception of the PDSCH being within the threshold period of time after the scheduled reception of the PDCCH, one or more transmission control indicator (TCI) states for receiving the PDSCH irrespective of TCI state(s) indicated in the PDCCH, wherein the selected one or more TCI states correspond to a lowest TCI codepoint that includes two TCI states; and
  receiving the PDSCH using the selected one or more TCI states, wherein the PDSCH is repeated in time, wherein a first TCI state of the selected one or more TCI states is used for receiving a first repetition, and wherein a second TCI state of the selected one or more TCI states is used for receiving a second repetition.

12. The method of claim 11, further comprising:
 determining an ultra-reliable low latency communication (URLLC) scheme;
 wherein said receiving the PDSCH is performed based on the determined URLLC scheme.

13. The method of claim 11, further comprising:
 receiving information indicating one or more TCI states within downlink control information (DCI);
 wherein said selecting the one or more TCI states is performed based on the number of indicated TCI states.

14. The method of claim 11, wherein said selecting of the one or more TCI states is also based on support of multiple transmission control indicator (multi-TCI) based default PDSCH quasi-colocation (QCL).

15. The method of claim 11, wherein the first repetition of the PDSCH is within the threshold duration, and wherein the second repetition of the PDSCH is within the threshold duration.

16. The method of claim 11, wherein said selecting the one or more TCI states is performed without decoding the PDCCH.

17. The method of claim 11, wherein the PDSCH is spread across the threshold duration.

18. The method of claim 17, wherein said selecting the one or more TCI states is performed for a portion of the PDSCH received before the threshold.

19. The method of claim 18, further comprising:
 decoding the PDCCH to determine an indicated TCI state.

20. The method of claim 19, wherein said receiving the PDSCH is performed using the indicated TCI state for a portion of the PDSCH received after the threshold.

* * * * *